US009180826B2

(12) United States Patent
Sugimoto

(10) Patent No.: US 9,180,826 B2
(45) Date of Patent: Nov. 10, 2015

(54) IN-VEHICLE POWER SUPPLY APPARATUS

(71) Applicants: Furukawa Electric Co., Ltd., Tokyo (JP); Furukawa Automotive Systems Inc., Shiga (JP)

(72) Inventor: Kaoru Sugimoto, Tokyo (JP)

(73) Assignees: FURUKAWA ELECTRIC CO., LTD., Tokyo (JP); FURUKAWA AUTOMOTIVE SYSTEMS INC., Shiga (JP)

(*) Notice: Subject to any disclaimer, the term of this patent is extended or adjusted under 35 U.S.C. 154(b) by 0 days.

(21) Appl. No.: 14/084,528

(22) Filed: Nov. 19, 2013

(65) Prior Publication Data

US 2014/0081520 A1    Mar. 20, 2014

Related U.S. Application Data

(63) Continuation of application No. PCT/JP2012/069154, filed on Jul. 27, 2012.

(30) Foreign Application Priority Data

Jul. 29, 2011 (JP) .................................. 2011-166418

(51) Int. Cl.
*B60R 16/033* (2006.01)
*B60R 16/03* (2006.01)
*H02J 9/06* (2006.01)
*B60L 1/00* (2006.01)
*H02J 7/14* (2006.01)

(52) U.S. Cl.
CPC ............... *B60R 16/033* (2013.01); *B60R 16/03* (2013.01); *H02J 7/1438* (2013.01); *H02J 9/061* (2013.01); *B60L 1/00* (2013.01); *H02J 7/1423* (2013.01)

(58) Field of Classification Search
None
See application file for complete search history.

(56) References Cited

U.S. PATENT DOCUMENTS 6,009,864 A * 1/2000 Basso et al. ................... 123/599
2011/0031805 A1 * 2/2011 Yamashita et al. ............. 307/9.1

FOREIGN PATENT DOCUMENTS

| CN | 101999200 A | 3/2011 |
|---|---|---|
| JP | 2001-175366 A | 6/2001 |
| JP | 2002-233078 A | 8/2002 |

(Continued)

OTHER PUBLICATIONS

International application No. PCT/JP2012/069154: International Search Report dated Sep. 11, 2012, 3 pages.
Japanese Patent Application No. 2011-166418: Office Action dated Aug. 5, 2013, 6 pages.
Japanese Patent Application No. 2011-166418: Decision to Grant a Patent dated Nov. 25, 2013, 4 pages.

(Continued)

Primary Examiner — John R Olszewski
Assistant Examiner — Gerrad A Foster
(74) Attorney, Agent, or Firm — Baker & Hostetler LLP

(57) ABSTRACT

An in-vehicle power supply apparatus that provides power supply from a secondary battery installed in a vehicle to at least one in-vehicle device, includes a voltage compensating unit that suppresses and compensates for a decrease in a power supply voltage supplied to the at least one in-vehicle device in a case where a voltage supplied to the at least one in-vehicle devices has become less than or equal to a first predetermined value, and an uninterruptible power supply unit that supplies electric power of another secondary battery different from the secondary battery to at least a part of the at least one in-vehicle device in a case where a voltage supplied to the at least one in-vehicle device has become less than or equal to a second predetermined value that is smaller than the first predetermined value.

8 Claims, 13 Drawing Sheets

(56) References Cited

FOREIGN PATENT DOCUMENTS

| | | |
|---|---|---|
| JP | 2004-229447 A | 8/2004 |
| JP | 2009-248748 A | 10/2009 |
| JP | 2010-115010 A | 5/2010 |
| WO | WO 97/30502 A1 | 8/1997 |

OTHER PUBLICATIONS

European Patent Application No. 12820435.1; Extended European Search Report; dated Feb. 9, 2015; 6 pages.
China Application No. 201280006870.9; Office Action; dated Jan. 12, 2015; 12 pages.

* cited by examiner

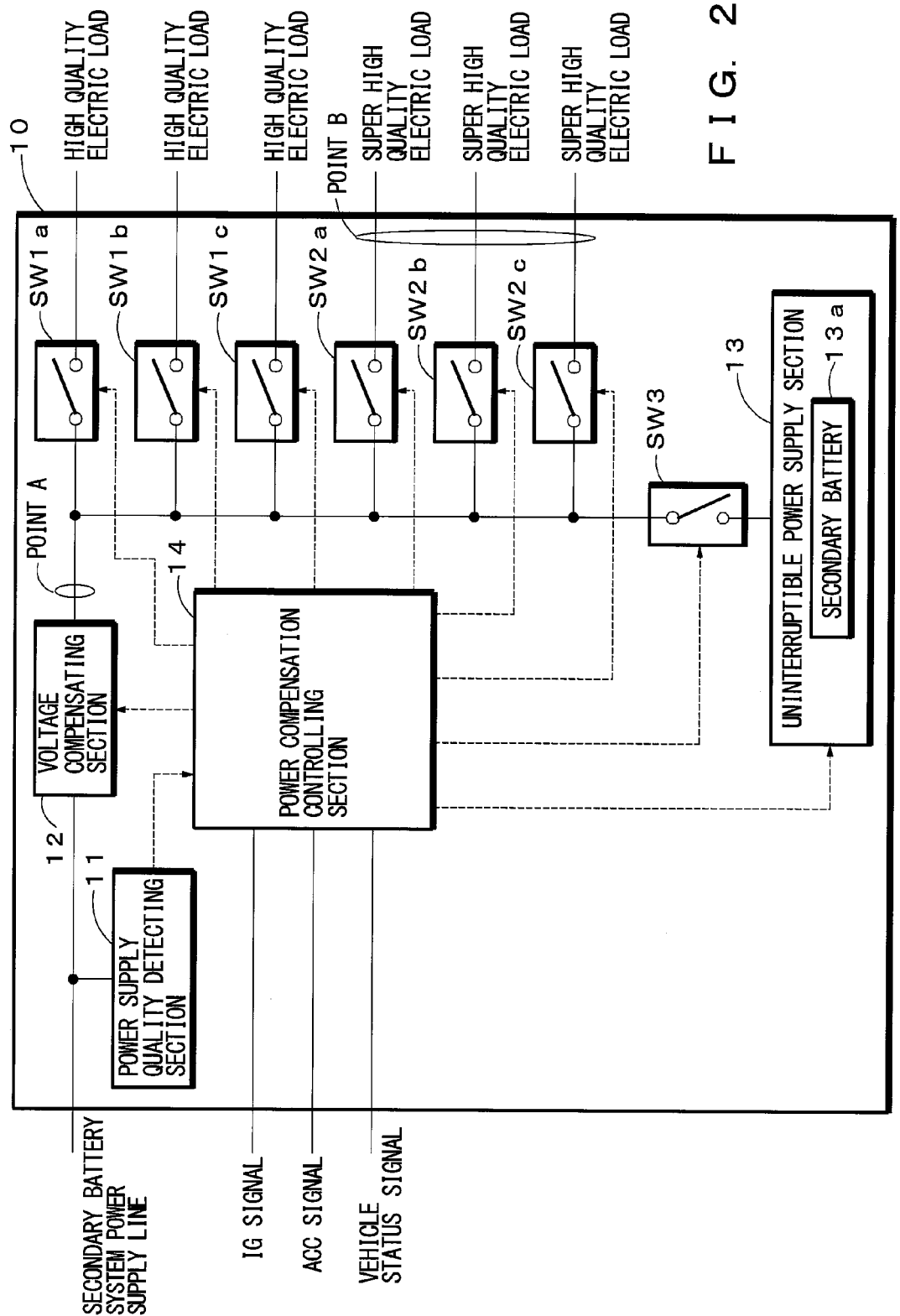
F I G. 2

| CATEGORY | TARGET SYSTEM | HIGH QUALITY ELECTRIC LOAD | SUPER HIGH QUALITY ELECTRIC LOAD |
|---|---|---|---|
| | | VOLTAGE COMPENSATING SECTION | UNINTERRUPTIBLE POWER SUPPLY SECTION |
| CHASSIS SYSTEM | ELECTRONIC CONTROL BRAKE | ○ | ○ |
| | ELECTRIC POWER STEERING | ○ | |
| | TRANSMISSION | ○ | |
| BODY SYSTEM | DOOR LOCK | ○ | ○ |
| | POWER WINDOW | ○ | ○ |
| | METER | | |
| MULTIMEDIA SYSTEM | AUDIO DEVICE | | |
| SAFETY SYSTEM | EMERGENCY CALL DEVICE | | ○ |
| | AIR BAG | | ○ |
| POWER SUPPLY SYSTEM | POWER SOURCE CONTROL DEVICE | ○ | |

FIG. 3

|  | SUPER HIGH QUALITY ELECTRIC LOAD | HIGH QUALITY ELECTRIC LOAD | STANDARD QUALITY ELECTRIC LOAD |
|---|---|---|---|
| HIGH POWER LOAD OPERATION MODE | FIRST VOLTAGE | FIRST VOLTAGE | NO COMPENSATION |
| MAIN POWER SUPPLY SYSTEM FAILURE MODE | FIRST VOLTAGE (UNINTERRUPTIBLE POWER SUPPLY VOLTAGE) | NO COMPENSATION | NO COMPENSATION |
| ENERGY RECOVERY POWER GENERATION MODE | FIRST VOLTAGE | FIRST VOLTAGE | NO COMPENSATION |

FIG. 4

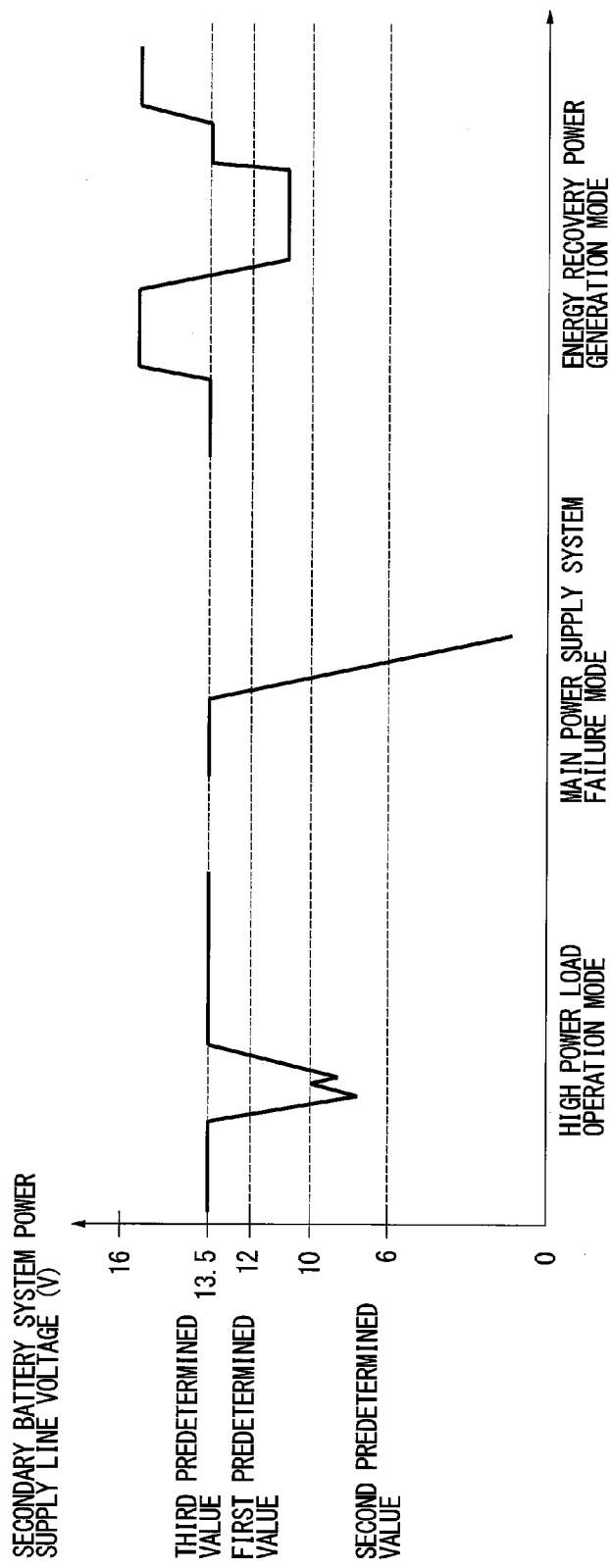
F I G. 5

IN-VEHICLE POWER SUPPLY APPARATUS

CROSS REFERENCE TO RELATED APPLICATIONS

This is a continuation application of International Patent Application No. PCT/JP2012/069154, filed Jul. 27, 2012, which claims the benefit of Japanese Patent Application No. 2011-166418, filed Jul. 29, 2011, the full contents of both of which are hereby incorporated by reference herein in their entirety.

BACKGROUND OF INVENTION

1. Field of the Invention

The present invention relates to an in-vehicle power supply apparatus.

2. Background of the Invention

In-vehicle devices, which are electric loads installed in a vehicle such as an automobile, are generally supplied with electric power from a secondary battery, such as a lead-acid battery, or from an alternator. There are some in-vehicle devices, such as a steering motor, in which power consumption changes in accordance with, for example, a running condition of the vehicle. In such in-vehicle devices, a voltage of the secondary battery may fluctuate due to the running condition of the vehicle and an operation of the in-vehicle device may become unstable.

Accordingly, in the related art, for example, a technique is proposed in which an electric power, which is outputted from the secondary battery, is supplied to an in-vehicle device via a booster circuit device, and a target voltage of the boosting operation is adjusted in accordance with a state of the vehicle (see Japanese Laid-Open Patent Publication Nos. 2010-115010 and 2009-248748).

In the related art, there is a problem that, when a voltage of a secondary battery largely decreases and becomes lower than the lowest operating voltage of the booster circuit device, the boosting control becomes impossible and the voltage cannot be maintained within a normal range. In such a case, particularly, there is a problem that, an appropriate voltage is not supplied even for an in-vehicle device necessary for ensuring safety and thus making it difficult to ensure safety.

Accordingly, it is an object of the invention to provide an in-vehicle power supply apparatus that can supply an appropriate voltage to an in-vehicle device even in a case where there is a voltage fluctuation in the secondary battery.

SUMMARY OF INVENTION

In order to achieve the above object, an in-vehicle power supply apparatus that provides power supply from a secondary battery installed in a vehicle to at least one in-vehicle device includes a voltage compensating unit that suppresses and compensates for a decrease in a power supply voltage supplied to the at least one in-vehicle device in a case where a voltage supplied to the at least one in-vehicle devices has become less than or equal to a first predetermined value, and an uninterruptible power supply unit that supplies electric power of another secondary battery different from the secondary battery to at least a part of the at least one in-vehicle device in a case where a voltage supplied to the at least one in-vehicle device has become less than or equal to a second predetermined value that is smaller than the first predetermined value.

With such a configuration, an appropriate voltage can be supplied to the in-vehicle device, even in a case where voltage fluctuation is produced in the secondary battery.

Further, according to another aspect of the invention, in addition to the above, the voltage compensating unit suppresses and compensates for an increase in a power supply voltage supplied to the at least one in-vehicle device in a case where a voltage supplied to the at least one in-vehicle device has become greater than or equal to a third predetermined value which is larger than the first predetermined value.

With such a configuration, for example, it is possible to prevent a voltage which is higher than normal from being applied to an in-vehicle device due to recovery power generation.

Further, according to another aspect of the invention, in addition to the above, the voltage compensating unit stops operating in a case where a voltage supplied to the at least one in-vehicle device has become less than or equal to the second predetermined value.

With such a configuration, since the voltage compensating unit stops operating, power consumption can be suppressed.

Further, according to another aspect of the invention, in addition to the above, the in-vehicle power supply apparatus further includes a power supply line for supplying electric power from the secondary battery to the at least one in-vehicle device, in a case where there is no power supply from one of the voltage compensating unit and the uninterruptible power supply unit.

With such a configuration, by duplexing the power supply line, the risk of a power supply failure due to disconnection or the like can be reduced.

Further, according to the invention, in addition to the above, the in-vehicle power supply apparatus further includes a bypassing unit that supplies electric power to the at least one in-vehicle device by bypassing the voltage compensating unit in a case where the voltage compensating unit is not operating.

With such a configuration, since the voltage compensating unit is bypassed, power consumption can be suppressed.

Further, according to an aspect of the invention, in addition to the above, in a case where a state of charge of the other secondary battery is greater than or equal to a predetermined value, the uninterruptible power supply unit supplies electric power to the at least one in-vehicle device and also stops driving the alternator to charge the secondary battery or decreases power generation.

With such a configuration, since the driving of the alternator is stopped or power generation is decreased, a load on the engine can be reduced and fuel consumption can be improved.

According to an aspect of the invention, it is possible to provide an in-vehicle power supply apparatus that can supply an appropriate voltage to an in-vehicle device even if there is a voltage fluctuation in the secondary battery.

BRIEF DESCRIPTION OF DRAWINGS

FIG. 2 is a block diagram showing a detailed exemplary configuration of the in-vehicle power supply apparatus shown in FIG. 1.

FIG. 3 is a diagram showing an example of a high quality electric load and a super high quality electric load.

FIG. 4 is a diagram showing an example of a voltage compensated for each load.

FIG. 5 is a diagram showing a change in voltage for each operation mode.

DETAILED DESCRIPTION

Hereinafter, embodiments of the present invention will be described.

(A) Description of Configuration of an Embodiment

Figure 1:
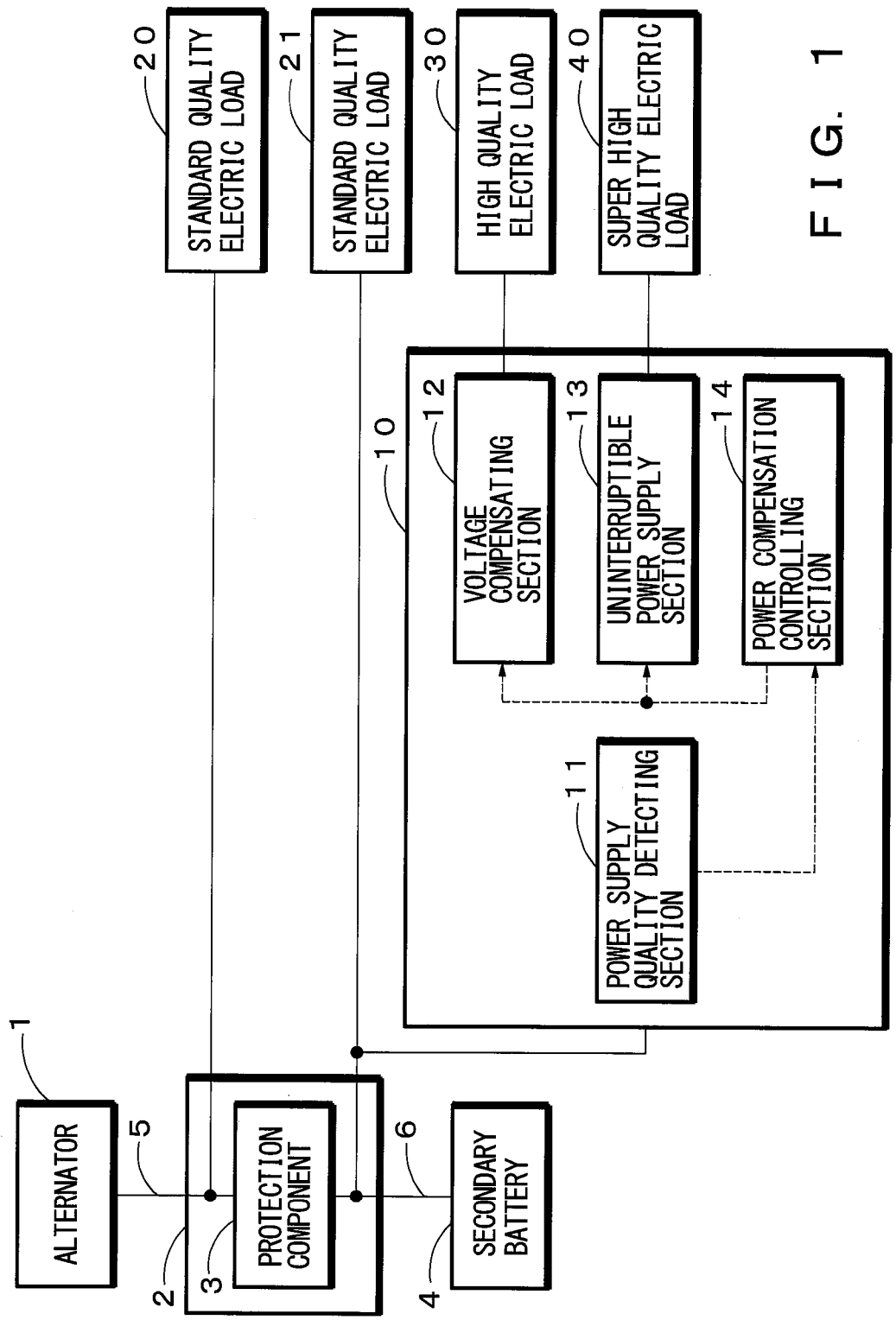
FIG. 1 is diagram showing an exemplary configuration of an in-vehicle power supply apparatus according to an embodiment of the invention.
Figure 6:
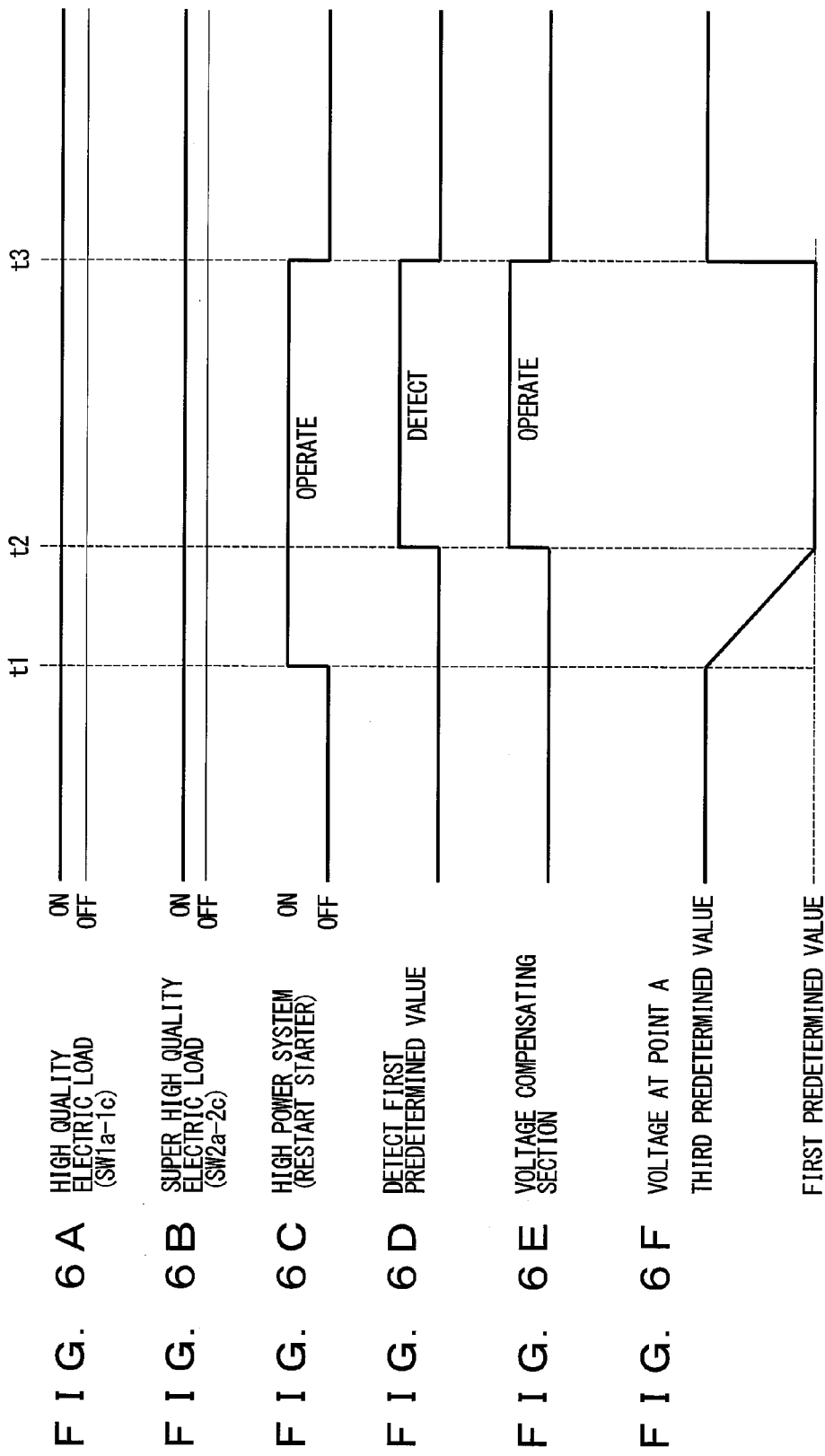
FIGS. 6A to 6F are diagrams showing an operation in a high power load operation mode.
Figure 7:
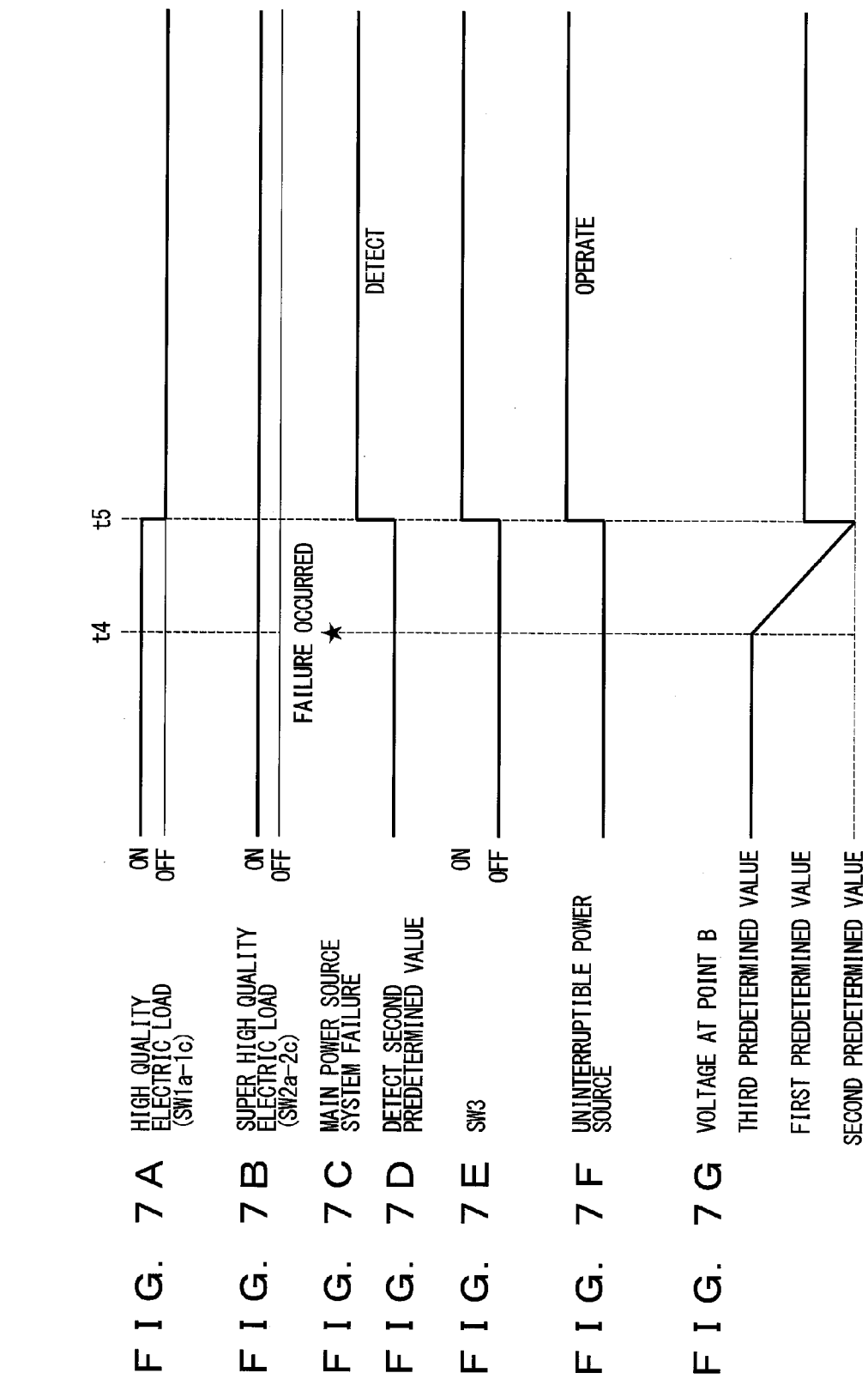
FIGS. 7A to 7G are diagrams showing an operation in a main power supply system failure mode.
Figure 8:
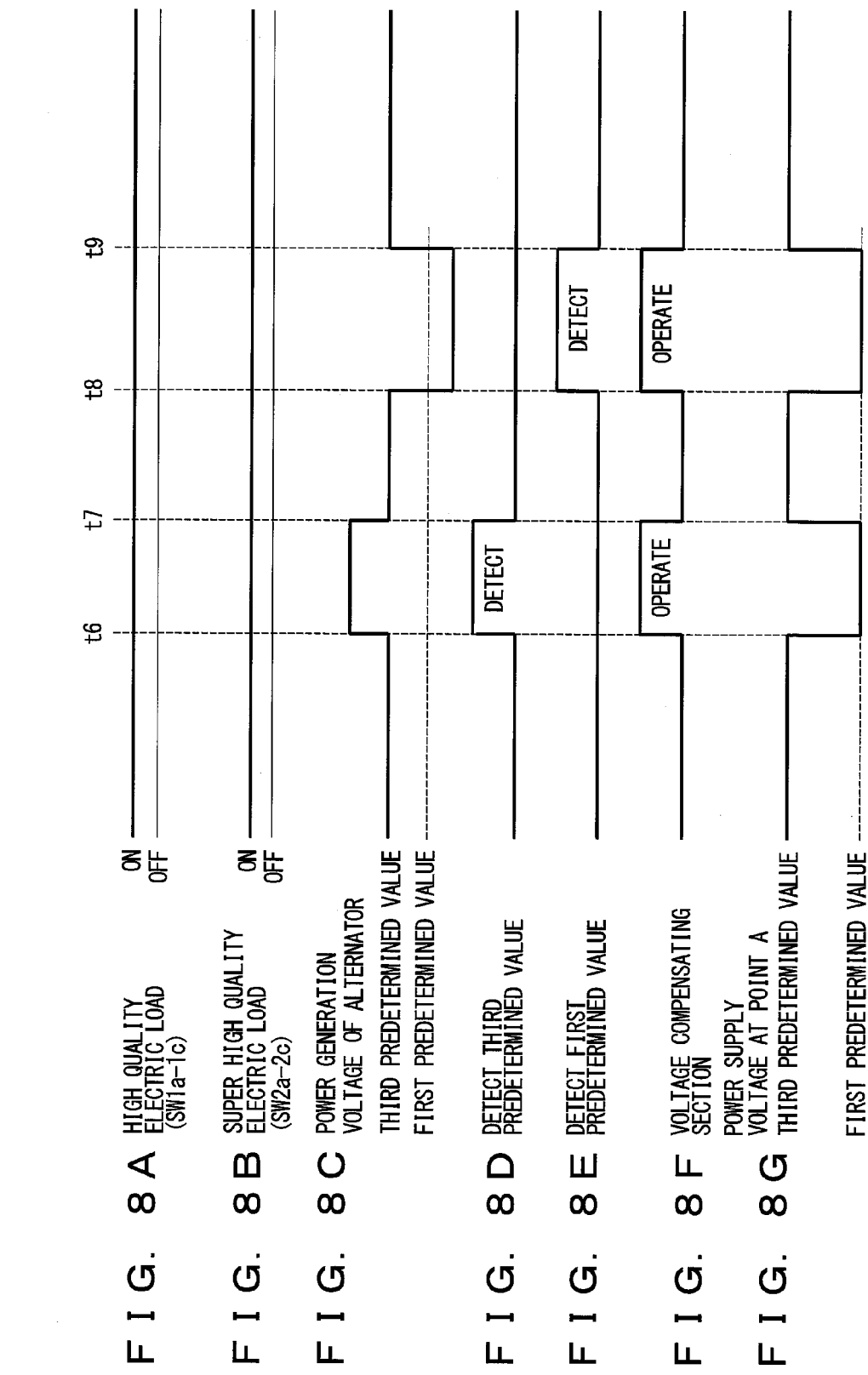
FIGS. 8A to 8G are diagrams showing an operation in an energy recovery power generation mode.

FIG. 1 is a diagram showing an exemplary configuration of an in-vehicle power supply apparatus according to an embodiment of the invention. Referring to FIG. 1, an alternator 1 generates power by being driven with a motor such as a reciprocating engine or a rotary engine, and charges a secondary battery 4. A power distribution section 2 is provided with, for example, a protection component 3 such as an electromagnetic relay or a fuse which is installed therein, and connects the alternator 1 to the secondary battery 4.

The secondary battery 4 is constituted by, for example, a lead-acid battery, a nickel cadmium battery, a nickel metal hydride battery or a lithium-ion battery or the like. The secondary battery 4 is charged with power generated by the alternator 1 and supplies the charged electric power to the in-vehicle power supply apparatus 10 and to a load. An alternator system power supply line 5 is a line that connects the alternator 1 with the power distribution section 2. A secondary battery system power supply line 6 is a line that connects the power distribution section 2 with the secondary battery 4.

The in-vehicle power supply apparatus 10 includes a power supply quality detecting section 11, a voltage compensating section 12, an uninterruptible power supply section 13 and a power compensation controlling section 14 as its main constituent elements. The in-vehicle power supply apparatus 10 is supplied with electric power from the secondary battery power supply line 6 and supplies electric power to a high quality electric load 30 and a super high quality electric load 40.

FIG. 2 shows a detailed exemplary configuration of the in-vehicle power supply apparatus 10 shown in FIG. 1. As shown in this figure, the in-vehicle power supply apparatus 10 includes the power supply quality detecting section 11, the voltage compensating section 12, the uninterruptible power supply section 13, the power compensation controlling section 14, SW1a-SW1c, SW2a-SW2c, and SW3.

The power supply quality detecting section 11 is connected to the secondary battery system power supply line 6 to detect a voltage applied to the electric load and notifies the power compensation controlling section 14 of a detection result. The voltage compensating section 12 is, for example, constituted by a DC-DC converter. Under the control of the power compensation controlling section 14, the voltage compensating section 12 adjusts the voltage applied by the secondary battery system power supply line 6 to a predetermined voltage, and then supplies to SW1a-SW1c, SW2a-SW2c and SW3.

The uninterruptible power supply section 13 has a secondary battery 13a which is different from the secondary battery 4, and supplies electric power stored in this secondary battery 13a to each section via SW3. The secondary battery 13a is, for example, constituted by a lead-acid battery, a nickel cadmium battery, a nickel metal hydride battery or a lithium-ion battery, and charged with power generated by the alternator 1. The secondary battery 13a is a battery that is independent and different from the secondary battery 4. The secondary battery 13a has an output voltage which is substantially the same as that of the secondary battery 4, and has a capacity of about ⅒ to ½ of that of the secondary battery 4. Specifically, in a case where the secondary battery 4 has a capacity of about 50 Ah, it is possible to use the one having a capacity of about 5 to 25 Ah. The secondary battery 13a is, for example, placed in a luggage area or near the center of the vehicle, whereas the secondary battery 4 is placed in an engine room.

The power compensation controlling section 14 is, for example, constituted by a central processing unit and a semiconductor memory or the like. The power compensation controlling section 14 controls the voltage compensating section 12, the uninterruptible power supply section 13, SW1a-SW1c, SW2a-SW2c and SW3 based on the power supply quality detecting section 11, an IG (Ignition) signal, an ACC (Accessory) signal and a vehicle status signal or the like.

SW1a-SW1c, SW2a-SW2c and SW3 are constituted by an electromagnetic relay or a semiconductor switch and controlled to an ON or OFF state with the power compensation controlling section 14. When SW1a-SW1c are turned to an ON state, electric power outputted from the voltage compensating section 12 is supplied to a high quality electric load 30. When SW2a-SW2c are turned to an ON state, electric power outputted from the voltage compensating section 12 and electric power outputted from the uninterruptible power supply section 13 when or SW3 is in the ON state are supplied to the super high quality electric load 40.

Returning to FIG. 1, the standard quality electric load 20 which is provided as an in-vehicle device is, for example, constituted by a power seat, an air conditioner, a windshield wiper motor, a defogger heater and the like. Similarly, the standard quality electric load 21 which is provided as an in-vehicle device is constituted by a head lamp, a braking lamp, a braking light, a hazard light and the like. The standard quality electric load 20 is supplied with electric power through the alternator system power supply line 5, whereas the standard quality electric load 21 is supplied with electric power through the secondary battery system power supply line 6.

The high quality electric load 30 provided as an in-vehicle device is a load that requires electric power of a higher quality than those of the standard quality electric loads 20 and 21. The super high quality electric load 40 which is similarly provided as an in-vehicle device is a load that requires electric power of a higher quality than that of the high quality electric load 30. FIG. 3 is a diagram showing a detailed example of the high quality electric load and the super high quality electric load. In this example, the loads are classified into categories including a chassis system, a body system, a multimedia system, a safety system and a power supply system. Note that, in this diagram, black circles indicate sources of power supply. Here, an electronically controlled brake, an electric power steering and a transmission belong to the chassis system. The electronically controlled brake is supplied with electric power from the voltage compensating section 12 and the uninterruptible power supply section 13, and the electric power steering and the transmission are supplied with electric power from the voltage compensating section 12. A door lock, a power window, and a meter belong to the body system. The door lock and the power window are supplied with electric power from the voltage compensating section 12 and the uninterruptible power supply section 13, and the meter is supplied with electric power from the voltage compensating section 12. An audio device belongs to the multi-media system and is supplied with electric power from the voltage compensating section 12. An emergency call unit for performing an emergency call in case of an accident or the like and an air bag belong to the safety system, and electric power is supplied thereto from the uninterruptible power supply section 13. A power supply controlling device belongs to the power supply system, and electric power is supplied thereto from the uninterruptible power supply section 13.

In the example of FIG. 2, the uninterruptible power supply section 13 is connected to the electric load via SW3, whereas, it is preferable that the emergency call unit and the air bag shown in FIG. 3 are directly connected to the uninterruptible power supply section 13.

(B) Description of Operation According to Embodiment

Next, an operation according to the embodiment will be described. FIG. 4 is an explanatory diagram of an overview of the operation according to the present embodiment and shows a voltage which is compensated for in each operation mode. FIG. 5 is a diagram showing a change in voltage in each operation mode. Here, a high power load operation mode is an operation mode during which a high power is consumed, for example, when a starter motor is rotated. As shown in FIG. 5, in the high power load operation mode, a voltage of the secondary battery system power supply line 6 drops from 13.5 V, which is a voltage at the time of a normal operation, to below 10 V, and recovers with the start-up of the engine. In such an operation mode, a first voltage (first setting value, e.g., 12 V) is applied to the super high quality electric load 40 by the voltage compensating section 12 and the first voltage is similarly applied to the high quality electric load 30 by the voltage compensating section 12, whereas voltage compensation is not performed on the standard quality electric loads 20 and 21.

A main power supply system failure mode is an operation mode for a case where there is a failure in, for example, the alternator 1, the secondary battery 4 or a power supply line. As shown in FIG. 5, in the main power supply system failure mode, the voltage of secondary battery system power supply line 6 drops from 13.5 V, which is a voltage at the time of a normal operation, to 6 V or below. In such an operation mode, the first voltage is applied to the super high quality electric load 40 by the uninterruptible power supply section 13, and voltage compensation is not performed for the high quality electric load 30 and the standard quality electric loads 20 and 21.

An energy recovery power generation mode is an operation mode in which, by adjusting an output voltage of the alternator 1, a kinetic energy of the vehicle is converted into an electric energy and stored in the secondary battery 4, and a load on the engine is reduced to improve fuel consumption. As shown in FIG. 5, in the energy recovery power generation mode, the voltage of the secondary battery system power supply line 6 either increases to 13.5 V or above and drops to 12 V or below depending on an output voltage of the alternator 1. In such an operation mode, the first voltage is applied to the super high quality electric load 40 by the voltage compensating section 12 and the first voltage is also applied to the high quality electric load 30 by the voltage compensating section 12, whereas voltage compensation is not performed for the standard quality electric loads 20 and 21.

In this manner, by determining the voltage to compensate for depending on an attribute of the load, since the supply of the first voltage for the electronic control brake, for example, is compensated for in any case, safety can be ensured. On the other hand, as for the electric power steering, electric power is supplied from the voltage compensating section 12 only. The reason why electric power is supplied from the voltage compensating section 12 only is that, since the electric power steering assists in a steering operation with an electric motor, the steering operation itself can be performed even if electric power is not supplied. Since the electric power steering has a large power consumption, if electric power is supplied from the uninterruptible power supply section 13, electric power of the secondary battery 13a, which has a capacity smaller than that of the secondary battery 4, will be consumed. Therefore, electric power is supplied from the voltage compensating section 12 only.

The door lock and the power window are supplied with electric power from both the voltage compensating section 12 and the uninterruptible power supply section 13 to prevent doors and windows from being unable to open and close in case of emergency. Further, the emergency call unit and the air bag are always supplied with electric power from the uninterruptible power supply section 13. Since these devices need to work positively even in case of an accident, as has been described above, electric power is supplied from the secondary battery 13a situated at a place, such as near the center of the vehicle, where it is less likely to be destroyed by an impact such as a collision.

In this manner, since the loads are classified based on their attributes and a voltage corresponding to the attribute of the classified load is compensated for, a voltage appropriate for each load can be supplied even in a case where the voltage of the secondary battery 4 has fluctuated or an unexpected situation such as an accident has occurred.

Referring to FIGS. 6A to 8G, detailed operations of the present embodiment will be described below. FIGS. 6A to 6F are diagrams for explaining an operation in the high power load operation mode. In the example of FIGS. 6A to 6F, the starter motor, which is a high power system, is turned to an ON state at time t1 (see FIG. 6C), and the engine is restarted. It is to be noted that, at this time, SW1a-SW1c and SW2a-SW2c are in an ON state (see FIGS. 6A, 6B), and SW3 is in an OFF state. When the starter motor is rotated at time t1, the voltage of the secondary battery system power supply line 6 drops as shown at the left end in FIG. 5. The voltage of the secondary battery system power supply line 6 is usually around 13.5 V, and, due to the rotation of the starter motor, it becomes 12 V or below, which is the first predetermined value. When the voltage of the secondary battery system power supply line 6 becomes 12 V or below, the power supply quality detecting section 11 detects this at time t2 (see FIG. 6D) and gives notice to the power compensation controlling section 14.

When the voltage of the secondary battery system power supply line 6 becomes less than or equal to the first predetermined value, the power compensation controlling section 14 brings the voltage compensating section 12 into operation (see FIG. 6E). The voltage compensating section 12 controls the voltage supplied from the secondary battery system power supply line 6 to come to the first predetermined value (in this example, 12 V), which is a target value. As a result, as shown in FIG. 6F, at the time the high power system starts operating, the voltage at point A (see FIG. 2) drops from a third predetermined value (in this example, 13.5 V) which is a normal voltage. When the voltage becomes less than or equal to the first predetermined value, the voltage compensating section 12 operates and the voltage at point A is held at the first predetermined value. At this time, since SW1a-SW1c and SW2a-SW2c are in an ON state and SW3 is in an OFF state, the high quality electric load 30 and the super high quality electric load 40 are supplied with electric power in which the voltage is being compensated for by the voltage compensating section 12. At time t3, when the operation of the high power system is stopped, the voltage of the secondary battery system power supply line 6 exceeds the first predetermined value. Accordingly, the power supply quality detecting section 11 notifies the power compensation controlling section 14 of the fact that the first predetermined value has been exceeded, and the power compensation controlling section 14 stops the operation of the voltage compensating section 12 at time t3. As a result, the voltage at point A is restored to the third predetermined value.

With the operation described above, for example, even in a case where the voltage of the secondary battery system power supply line 6 has dropped due to a high current through the starter motor, it is possible to prevent the voltage applied to high quality electric load 30 and the super high quality electric load 40 from dropping to the first predetermined value or below.

Referring now to FIGS. 7A to 7G, an operation of the main power supply system failure mode will be described. FIGS. 7A to 7G show that a failure has occurred in the main power supply system at time t4 (see FIG. 7C). Note that, at this point, SW1a-SW1c and SW2a-SW2c are in an ON state (see FIGS. 7A and 7B), and SW3 is in an OFF state. When a failure occurs in the main power supply system at time t4, the voltage at point B (see FIG. 2) decreases as shown in FIG. 7G, and, at time t5, the power supply quality detecting section 11 determines that the voltage of the secondary battery system power supply line 6 has dropped to the second predetermined value or below, and gives notice to the power compensation controlling section 14. The power compensation controlling section 14 turns SW1a-SW1c to an OFF state (see FIG. 7A), and stops supplying power to the high quality electric load 30. Then, the power compensation controlling section 14 turns SW3 to an ON state (see FIG. 7E), and brings the uninterruptible power supply section 13 (see FIG. 7F) into operation. Since SW2a-SW2c and SW3 are turned to an ON state, the supplying of power from the uninterruptible power supply section 13 to the super high quality electric load 40 is started. Note that, since the output voltage of the uninterruptible power supply section 13 is set at the first predetermined value, the super high quality electric load 40 is supplied with a voltage of the first predetermined value (in this example, 12V, and, to be more precise, a battery voltage value of the uninterruptible power supply section).

With the aforementioned operation, the super high quality electric load 40 is supplied with power from the uninterruptible power supply section 13. Accordingly, for example, since electric power can be supplied continuously to an electric load required for ensuring safety regardless of the condition of the vehicle, safety can be ensured. Also, since electric power is supplied to the super high quality electric load 40 while blocking a supply of power to the high quality electric load 30, limited electric power of the secondary battery 13a can be preferentially supplied to the super high quality electric load 40 of a higher importance.

Referring now to FIGS. 8A to 8G, an operation in an energy recovery power generation mode will be described. As shown in FIGS. 8A to 8G, at time t6, the power generation voltage of the alternator 1 becomes greater than the third predetermined value (see FIG. 8C). This is, for example, in a case where the brake of the vehicle is operated, an increase in voltage upon converting a kinetic energy into an electrical energy and collecting it, to increase an amount of charge into the secondary battery 4 by increasing a power generation voltage of the alternator 1. When the power generation voltage of the alternator 1 becomes greater than the third predetermined value (see FIG. 8C), the power supply quality detecting section 11 detects this (see FIG. 8D) and gives notice to the power compensation controlling section 14. The power compensation controlling section 14 causes the voltage compensating section 12 to operate (see FIG. 8F). As a result, the voltage at point A (see FIG. 2) becomes a voltage at the first predetermined value (see FIG. 8G). Then, at time t7, when the recovery operation is terminated and the voltage of the alternator returns to the third predetermined value, the power supply quality detecting section 11 detects this, and the power compensation controlling section 14 causes an operation of the voltage compensating section 12 to stop (see FIG. 8F). As a result, the voltage at point A is restored to the third predetermined value (see FIG. 8G).

Subsequently, at time t8, the power generation voltage of the alternator 1 becomes less than or equal to the first predetermined value (see FIG. 8C). This is to reduce load on the engine to improve fuel consumption by decreasing the power generation voltage of alternator 1 (or stopping the alternator 1), for example, in a case where a power of the engine is required, such as during acceleration of the vehicle. When the power generation voltage of the alternator 1 becomes less than or equal to the first predetermined value (see FIG. 8C), the power supply quality detecting section 11 detects this (see FIG. 8E) and gives notice to the power compensation controlling section 14. The power compensation controlling section 14 causes the voltage compensating section 12 to operate (see FIG. 8F). As a result, the voltage at point A (see FIG. 2) becomes a voltage of the first predetermined value (see FIG. 8G). Then, at time t9, when an operation of reducing an engine load is terminated and the voltage of the alternator 1 returns to the third predetermined value (see FIG. 8C), the power supply quality detecting section 11 detects this, and the power compensation controlling section 14 causes the operation of the voltage compensating section 12 to stop (see FIG. 8F). As a result, the voltage at point A is restored to the third predetermined value (see FIG. 8G).

With the aforementioned operation, in a case where there is a change in the power generation voltage of the alternator 1, the voltage compensating section 12 is operated to suppress the fluctuation of the voltage. Accordingly, a voltage of an electric power supplied to the high quality electric load 30 and the super high quality electric load 40 can be compensated for to a constant value or higher. Thereby, these loads are supplied with electric power of a voltage which is different from normal, and it is possible to prevent the loads from being overloaded or malfunctions being produced.

Figure 9:
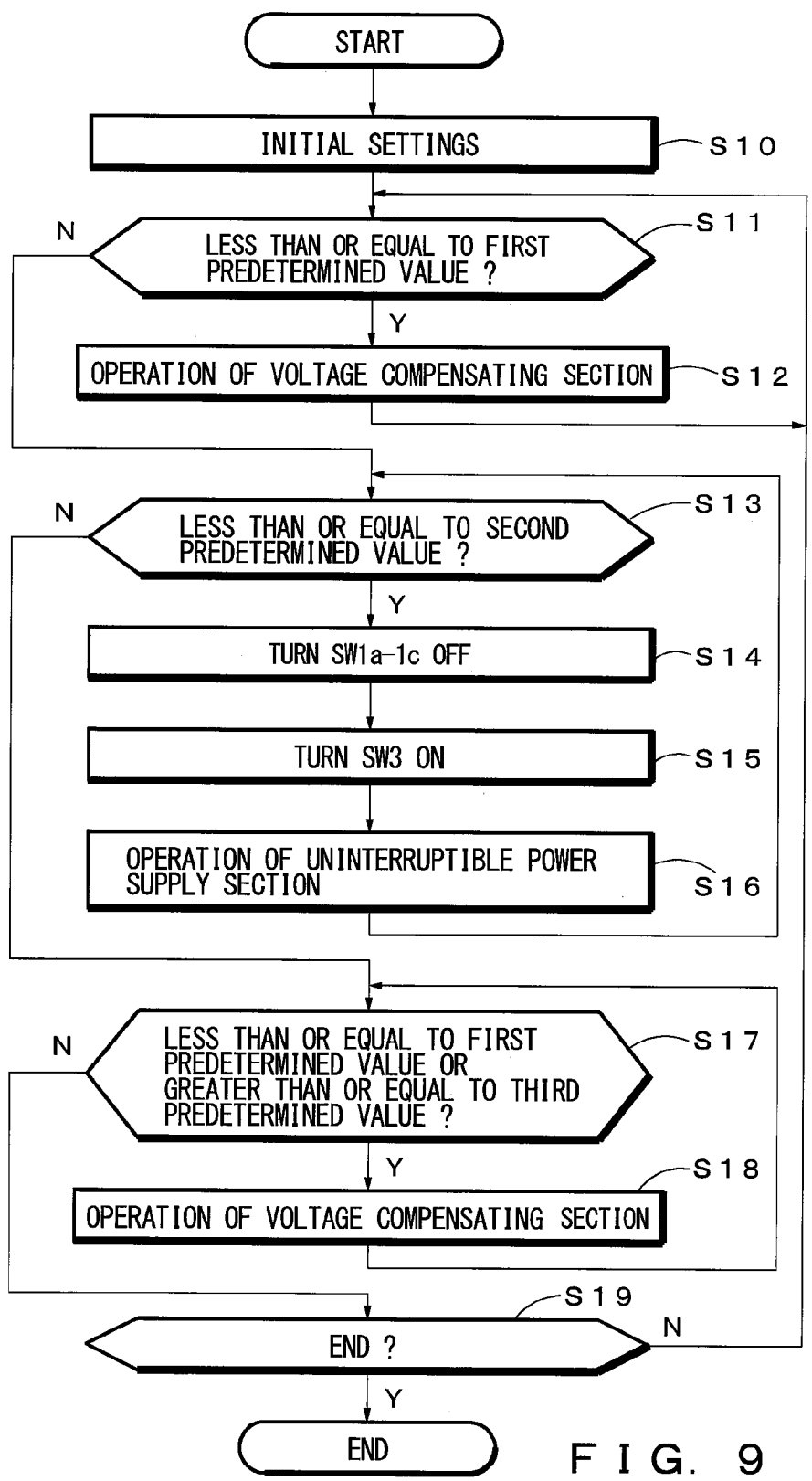
FIG. 9 is a flow chart for explaining a flow of processes carried out in the embodiment shown in FIG. 1.

Now, a flow chart for achieving the operation of an embodiment described above will be described with reference to FIG. 9. The flow chart shown in FIG. 9 is, for example, performed in a case where an ignition key of the vehicle is operated. When this flow chart is started, the following steps are performed.

In step S10, the power compensation controlling section 14 carries out an initial setting. To be more specific, operations of the voltage compensating section 12 and the uninterruptible power supply section 13 are brought to a stopped state, SW1a-1c and SW2a-2c are controlled to an ON state, and SW3 is controlled to an OFF state. Thereby, an electric power is supplied from the secondary battery 4 to each electric load.

In step S11, the power compensation controlling section 14 uses an output from the power supply quality detecting section 11 to determine whether or not a detected value is less than or equal to the first predetermined value, and in a case where it is less than or equal to the first predetermined value (step S11: Yes), proceeds to step S12, and else (step S11: No) proceeds to step S13. Specifically, for example, when the starter motor, which is a high current load, is rotated, the voltage of the secondary battery system power supply line 6 decreases and a voltage detected by the power supply quality detecting section 11 is less than or equal to 12V, it proceeds to step S12 and else proceeds to step S13.

In step S12, the power compensation controlling section 14 causes the voltage compensating section 12 to operate. As a result, even in a case where a supply voltage of the secondary battery system power supply line 6 decreases to less than or equal to 12V, which is the first predetermined value, it will be maintained at 12V by an operation of the voltage compensating section 12. When the process of step S12 is terminated, it returns to step S11 and repeats a similar process.

In step S13, the power compensation controlling section 14 uses an output of the power supply quality detecting section 11 to determine whether or not the detected value is less than or equal to the second predetermined value, and in a case where it is less than or equal to the second predetermined value (step S13: Yes), proceeds to step S14, and else (step S13: No) proceeds to step S17. Specifically, in a case where the voltage detected by the power supply quality detecting section 11 is less than or equal to 6V due to an occurrence of a failure in the main power supply system, it proceeds to step S14, and else proceeds to step S17.

In step S14, the power compensation controlling section 14 turns SW1a-1c to an OFF state. Thereby, a supply of electric power to the high quality electric load 30 is stopped.

In step S15, the power compensation controlling section 14 turns SW3 to an ON state. Thereby, the super high quality electric load 40 and the uninterruptible power supply section 13 are brought to an electrically connected state.

In step S16, the power compensation controlling section 14 causes the uninterruptible power supply section 13 to operate. Thereby, electric power is supplied from the uninterruptible power supply section 13 to the super high quality electric load 40. When the process of step S16 is terminated, it returns to step S13 and repeats a similar process. Note that, the process of step S15 and the process of S16 may be performed in a reversed order.

In step S17, the power compensation controlling section 14 uses an output of the power supply quality detecting section 11 to determine whether or not the detected value is less than or equal to the first predetermined value or greater than or equal to the third predetermined value, and if it is less than or equal to the first predetermined value or greater than or equal to the third predetermined value (step S17: Yes), proceeds to step S18, and else (step S17: No) proceeds to step S19. Specifically, in a case where the voltage of the secondary battery system power supply line 6 becomes less than or equal to the first predetermined value or greater than or equal to the third predetermined value due to an energy recovery power generation, it proceeds to step S18.

In step S18, the power compensation controlling section 14 causes the voltage compensating section 12 to operate. Thereby, a voltage at the first predetermined value is supplied to the high quality electric load 30 and to the super high quality electric load 40. When the process of step S18 is terminated, the process returns to step S17, and repeats a similar process.

In step S19, the power compensation controlling section 14 determines whether to terminate the process or not, and when it is not to be terminated (step S19: No), it returns to step S11 and repeats the process similar to the aforementioned case, and else (step S19: Yes) terminates the process. For example, in a case where the ignition key is operated and an engine is stopped, the process is terminated, and else returns to step S11.

According to the aforementioned process, an operation of the aforementioned embodiment can be achieved.

(C) Explanation of Variant Embodiment

The aforementioned embodiment is shown by way of example, and the invention is not limited to the cases described above. For example, although in the embodiment shown in FIG. 1, electric power is supplied to the high quality electric load 30 and the super high quality electric load 40 from the voltage compensating section 12 and the uninterruptible power supply section 13 only, electric power may also be supplied from the secondary battery system power supply line 6 through a power supply line 50, as shown in FIG. 1. More particularly, in the example of FIG. 10, the high quality electric load 30 is supplied with electric power from the secondary battery system power supply line 6 through the power supply line 50, and also supplied with electric power from the voltage compensating section 12. Further, the super high quality electric load 40 is supplied with electric power from the secondary battery system power supply line 6 through the power supply line 50, and supplied with electric power from the voltage compensating section 12 and the uninterruptible power supply section 13.

Figure 11:
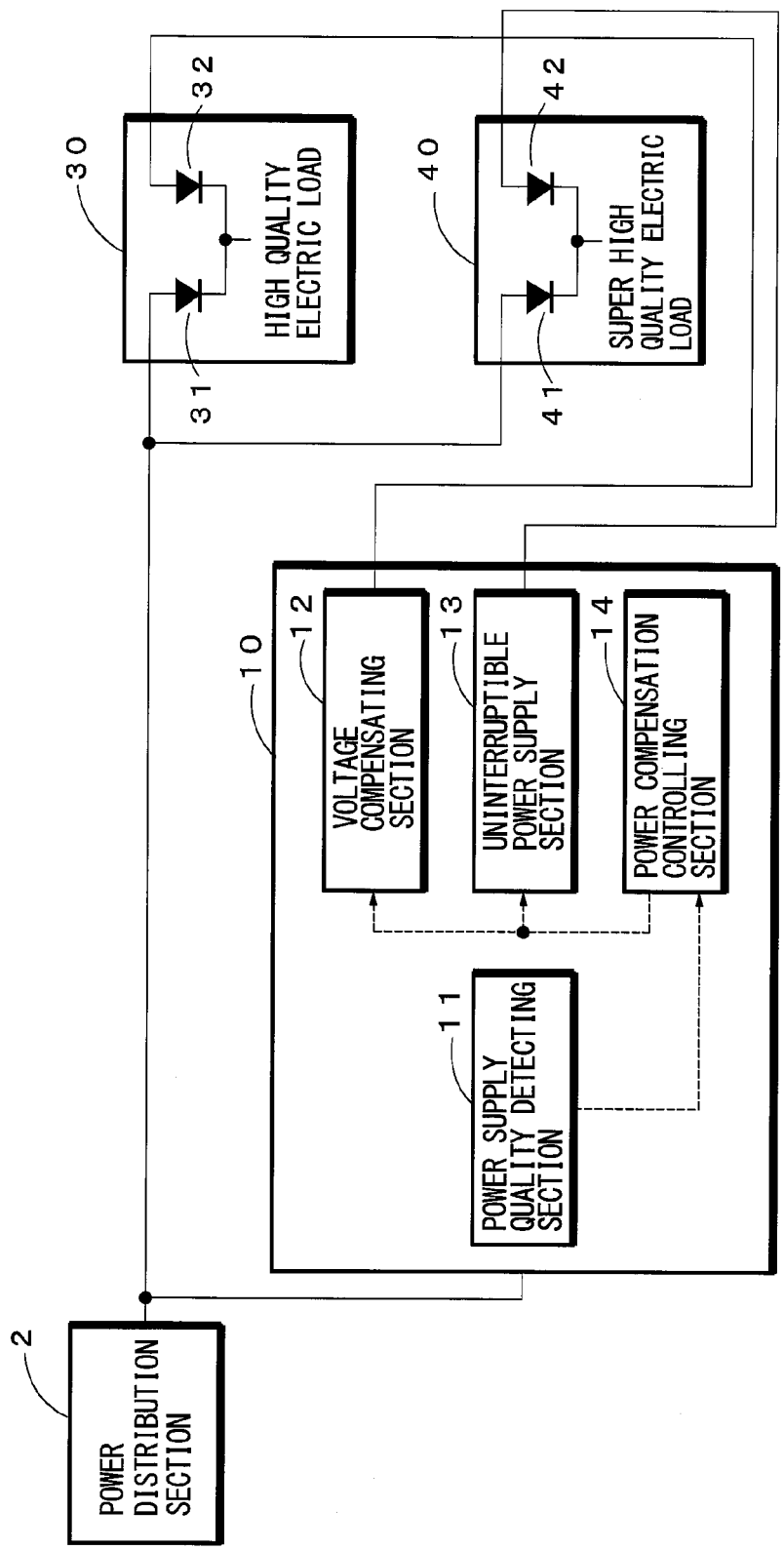
FIG. 11 is a diagram showing a detailed exemplary configuration of FIG. 10.

FIG. 11 is a diagram schematically illustrating an exemplary configuration of the high quality electric load 30 and the super high quality electric load 40. In an example of FIG. 11, diodes 31, 32 are disposed inside the high quality electric load 30. Electric power supplied from the power distribution section 2 is supplied to an anode of the diode 31 and electric power supplied from the voltage compensating section 12 is supplied to an anode of the diode 32. A cathode of each of the diodes 31, 32 is connected to the electric load. Further, diodes 41, 42 are disposed inside the super high quality electric load 40. Electric power supplied from the power distribution section 2 is supplied to an anode of the diode 41 and electric power supplied from the uninterruptible power supply section 13 is supplied to an anode of the diode 42. A cathode of each of the diodes 41, 42 is connected to the electric load. With such a configuration, in a case where neither the voltage compensating section 12 nor the uninterruptible power supply section 13 are operating, electric power from the power distribution section 2 is supplied to the high quality electric load 30 and to the super high quality electric load 40. When the voltage of secondary battery 4 drops, the voltage compensating section 12 or the uninterruptible power supply section 13 starts operating. In such a case, since an output voltage of the voltage compensating section 12 or the uninterruptible power supply section 13 becomes higher than the voltage of the secondary battery 4, an output voltage of the voltage compensating section 12 or the output voltage of uninterruptible power supply section 13 is supplied to the high quality electric load or the super high quality electric load. At this time, since the diodes 31, 41 are in a reverse-biased state, the supply of the electric power from the secondary battery 4 is stopped.

Figure 10:
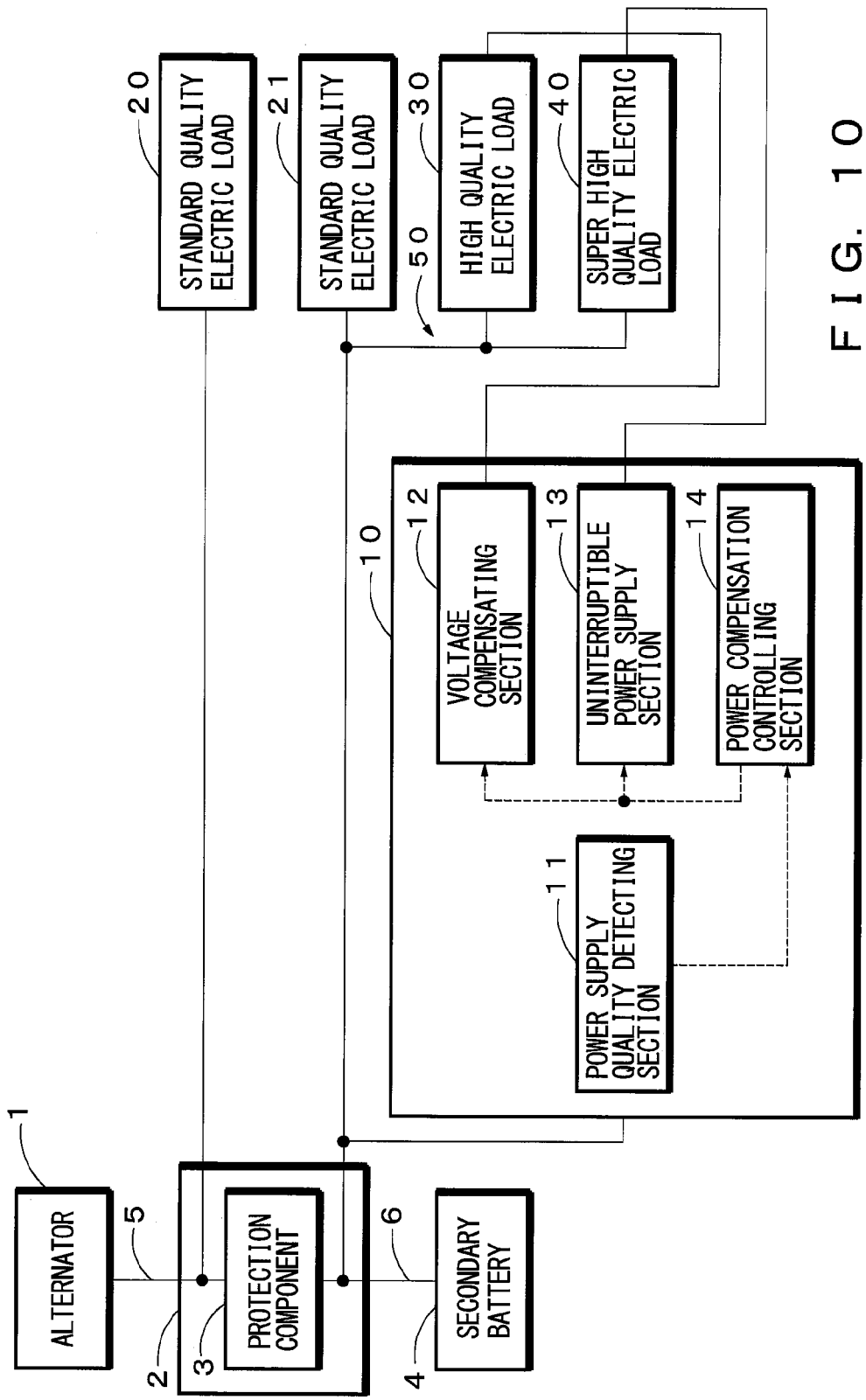
FIG. 10 is a diagram for explaining another embodiment of the invention.

As has been described above, according to the variant embodiment shown in FIG. 10, the wiring is duplexed and electric power is supplied from the secondary battery 4 as well as from the voltage compensating section 12 or the uninterruptible power supply section 13. Therefore, with a redundant wiring, it is possible to reduce the risk of interruption of power supply by, for example, disconnection or the like.

Figure 12:
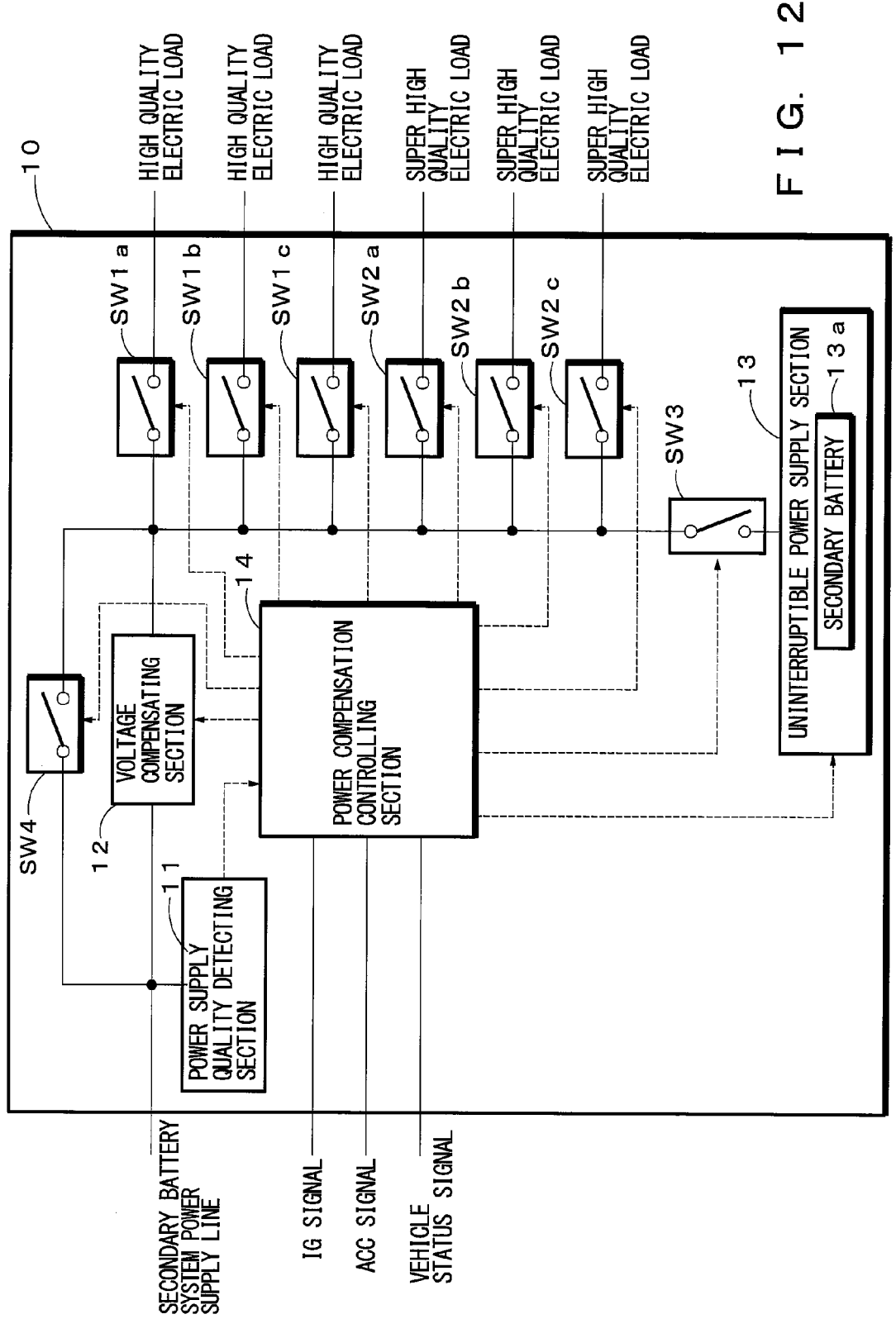
FIG. 12 is a diagram for explaining another embodiment of the invention.

FIG. 12 is an exemplary diagram of another embodiment of the invention. In this example, SW4 which bypasses the voltage compensating section 12 is added to an example of FIG. 2. SW4 is controlled by the power compensation controlling section 14. During the stoppage of an operation of the voltage compensating section 12 (while the voltage of the secondary battery 4 is exceeding the first predetermined value and is less than the third predetermined value), SW4 is brought to an ON state to supply electric power to the electric load while bypassing the voltage compensating section 12. With such an embodiment, in a case where an operation of the voltage compensating section 12 is being stopped, a loss of electric power in the voltage compensating section 12 can be suppressed by bypassing voltage compensating section 12.

Figure 13:
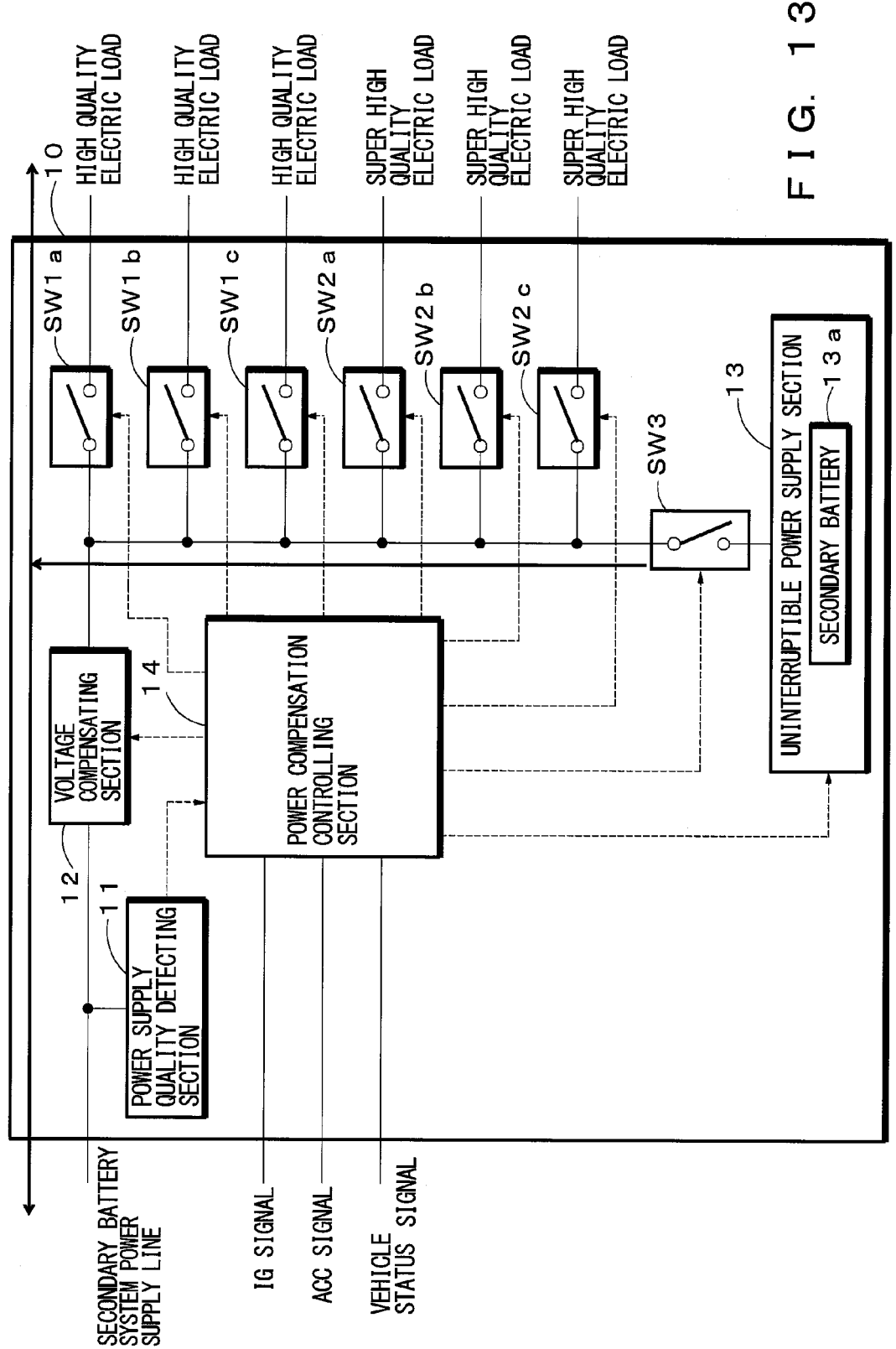
FIG. 13 is a diagram for explaining an operation of another embodiment of the invention.

In each of the aforementioned embodiments, the uninterruptible power supply section 13 is configured to operate only when the voltage of the secondary battery 4 has become less than or equal to the second predetermined value. However, in a case where the remaining battery level of the secondary battery 13a which is built in the uninterruptible power supply section 13 is greater than or equal to a predetermined level (e.g., in a case where SOC (State of Charge) is greater than or equal to 50%), the alternator 1 may be stopped driving or an amount of power generation may be reduced, and as shown in FIG. 13 with a heavy line, electric power may be supplied from the uninterruptible power supply section 13 to the electric load and the secondary battery 13a of the uninterruptible power supply section 13 may be charged, for example, during the energy recovery power generation while decelerating. With such an embodiment, fuel consumption can be improved by reducing the load on the engine.

In each of the aforementioned embodiments, the quality of the power supply is detected by the power supply quality detecting section 11. However, for example, it is also possible to detect the power supply quality by the power generation voltage of the alternator 1 or to detect depending on a state (e.g., SOC or SOH (State of Health)) of the secondary battery 4. Alternatively, the power supply quality may be detected based on vehicle information (e.g., collision information). In such a case, the power supply quality detecting section 11 can be omitted.

In each of the aforementioned embodiments, SW1a-1c and SW2a-2c are relays or semiconductor switches. However, these may be, for example, fuses. In such a case, an ON/OFF control by the power compensation controlling section 14 cannot be performed. Accordingly, for example, an SW may be added to an interconnecting line connecting SW1c and SW2a in FIG. 2 and the controlling may be performed by switching ON/OFF the SW. More specifically, when supplying electric power from the uninterruptible power supply section 13, the supply of power to the high quality electric load can be cut off by turning the SW to an OFF state.

Further, in each of the aforementioned embodiments, SW1a-1c, SW2a-2c and SW3 are installed in the in-vehicle power supply apparatus 10. However, for example, these switches may be installed in an existing junction block (J/B), a fuse box or a relay block (R/B). Alternatively, existing switches in a relay box or the like may be used as these switches.

What is claimed is:

1. An in-vehicle power supply apparatus that provides power supply from a secondary battery installed in a vehicle to in-vehicle devices, the in-vehicle devices being classified based on attributes of the in-vehicle devices, the in-vehicle power supply apparatus comprising:

a voltage compensating unit that compensates for a power supply voltage supplied to a first set of at least one in-vehicle device that is selected from the in-vehicle devices based on the attributes by increasing the power supply voltage in a case where a voltage supplied to the in-vehicle devices has become less than or equal to a first predetermined value; and an uninterruptible power supply unit that supplies electric power of a further secondary battery different from the secondary battery to a second set of at least one in-vehicle device that is selected from the in-vehicle devices based on the attributes in a case where a voltage supplied to the in-vehicle devices has become less than or equal to a second predetermined value that is smaller than the first predetermined value, the second set of at least one in-vehicle device being different from the first set of at least one in-vehicle device.

2. The in-vehicle power supply apparatus according to claim 1, wherein the voltage compensating unit compensates for a power supply voltage supplied to the in-vehicle devices by decreasing the power supply voltage in a case where a voltage supplied to the in-vehicle devices has become greater than or equal to a third predetermined value which is larger than the first predetermined value.

3. The in-vehicle power supply apparatus according to claim 1, wherein the voltage compensating unit stops operating in a case where a voltage supplied to the in-vehicle devices has become less than or equal to the second predetermined value.

4. The in-vehicle power supply apparatus according to claim 1, further comprising a power supply line for supplying electric power from the secondary battery to the in-vehicle devices, in a case where there is no power supply from one of the voltage compensating unit and the uninterruptible power supply unit.

5. The in-vehicle power supply apparatus according to claim 1, further comprising a bypassing unit that supplies electric power to the in-vehicle devices by bypassing the voltage compensating unit in a case where the voltage compensating unit is not operating.

6. The in-vehicle power supply apparatus according to claim 1, wherein, in a case where a state of charge of the other secondary battery is greater than or equal to a predetermined value, the uninterruptible power supply unit supplies electric power to the in-vehicle devices and also stops driving an alternator to charge the secondary battery or decreases a power generation amount of the alternator.

7. The in-vehicle power supply apparatus according to claim 1, wherein, at least one of the in-vehicle devices is included in both the first set of at least one in-vehicle device and the second set of at least one in-vehicle device.

8. The in-vehicle power supply apparatus according to claim 4, further comprising at least one diode, each of the at least one diode having an anode that is connected to the power supply line and a cathode that is connected to one of the in-vehicle devices that is included in the first and/or second set of at least one in-vehicle device.

* * * * *